(12) United States Patent
Ling et al.

(10) Patent No.: US 10,437,619 B2
(45) Date of Patent: Oct. 8, 2019

(54) SYSTEM AND METHOD FOR PHYSICAL MACHINE MONITORING AND ANALYSIS

(71) Applicant: Arch Systems, Inc., Mountain View, CA (US)

(72) Inventors: Christopher Ling, Mountain View, CA (US); Luke Michael Ekkizogloy, Mountain View, CA (US); Timothy Matthew Burke, Mountain View, CA (US)

(73) Assignee: Arch Systems Inc., Mountain View, CA (US)

( * ) Notice: Subject to any disclaimer, the term of this patent is extended or adjusted under 35 U.S.C. 154(b) by 0 days.

(21) Appl. No.: 16/218,164

(22) Filed: Dec. 12, 2018

(65) Prior Publication Data

US 2019/0179655 A1   Jun. 13, 2019

Related U.S. Application Data

(60) Provisional application No. 62/597,847, filed on Dec. 12, 2017.

(51) Int. Cl.
 *G06F 9/44* (2018.01)
 *G06F 9/455* (2018.01)
 *G06F 11/30* (2006.01)

(52) U.S. Cl.
 CPC ...... *G06F 9/45533* (2013.01); *G06F 11/3055* (2013.01); *G06F 11/3058* (2013.01);
 (Continued)

(58) Field of Classification Search
 CPC ... G06F 9/45533; G06F 9/455; G06F 9/45529
 (Continued)

(56) References Cited

U.S. PATENT DOCUMENTS

| 5,313,614 A | * | 5/1994 | Goettelmann | G06F 8/52 717/138 |
| 6,132,109 A | * | 10/2000 | Gregory | G06F 17/5022 703/14 |

(Continued)

OTHER PUBLICATIONS

DeAnna et al, "Simulation Monitoring Using intelligent Mobile Agent Technology ", ACM pp. 47-52 (Year: 2007).*

(Continued)

*Primary Examiner* — Anil Khatri
(74) *Attorney, Agent, or Firm* — Jeffrey Schox; Samuel Rosenthal

(57) ABSTRACT

A machine monitoring method preferably includes receiving packets, such as packets supplied to a physical machine, virtually simulating physical machine operation, and analyzing the virtual outputs of the virtual simulation. Virtually simulating physical machine operation is preferably performed based on the received packets, such as using a digital duplicate of the physical machine. Analyzing the virtual outputs can include, for example, determining simulated states of one or more aspects, such as physical components, of the physical machine, and/or determining that one or more events associated with physical machine operation have occurred. The method can optionally include, for example, transmitting the analysis results to a remote device, determining the digital duplicate of the physical machine, determining an analysis model for the virtual outputs of the digital duplicate, determining digital component modules, and/or determining digital analysis modules.

20 Claims, 4 Drawing Sheets

(52) U.S. Cl.
CPC .............. *G06F 2009/45591* (2013.01); *G06F 2009/45595* (2013.01)

(58) Field of Classification Search
USPC .................................................. 717/134–141
See application file for complete search history.

(56) References Cited

U.S. PATENT DOCUMENTS

| | | | | |
|---|---|---|---|---|
| 6,615,166 | B1* | 9/2003 | Guheen | G06Q 10/06 703/27 |
| 7,013,456 | B1* | 3/2006 | Van Dyke | G06F 9/45533 712/208 |
| 7,092,867 | B2* | 8/2006 | Huang | H04L 41/22 701/1 |
| 7,761,859 | B2* | 7/2010 | Low | G06F 8/20 717/140 |
| 7,827,531 | B2* | 11/2010 | Sen | G06F 11/3688 717/124 |
| 7,958,488 | B2* | 6/2011 | Cifra | G01R 31/318357 717/106 |
| 8,190,807 | B2* | 5/2012 | Reid | G06F 11/3636 711/3 |
| 8,229,726 | B1* | 7/2012 | Magdon-Ismail | G06F 17/5022 703/14 |
| 8,291,387 | B2* | 10/2012 | Pal | G06F 11/3688 703/21 |
| 8,640,110 | B2* | 1/2014 | Kopp | G06Q 10/067 717/135 |
| 8,650,552 | B1* | 2/2014 | Liao | G06F 11/3447 717/135 |
| 8,769,485 | B2* | 7/2014 | Salz | G06F 8/30 717/105 |
| 9,021,452 | B2* | 4/2015 | Kripalani | G06F 11/3664 717/135 |
| 9,244,742 | B2* | 1/2016 | Gulati | G06F 9/5061 |
| 9,348,632 | B2* | 5/2016 | Ge | G06F 9/45533 |
| 9,471,347 | B2* | 10/2016 | Birke | G06F 9/45533 |
| 2003/0188299 | A1* | 10/2003 | Broughton | G06F 8/427 717/141 |
| 2010/0286797 | A1 | 11/2010 | Liu et al. | |
| 2012/0116774 | A1* | 5/2012 | Forsell | A61N 1/37217 704/270 |
| 2016/0357443 | A1* | 12/2016 | Li | G06F 3/065 |
| 2016/0364927 | A1 | 12/2016 | Barry et al. | |

OTHER PUBLICATIONS

Mulford, "The Application of Software Monitor Data to Simulation" ACM, 162-170, (Year: 1973).*

Dwyer et al, "A Flexible Architecture for Building Data Flow Analyzers", IEEE, pp. 554-564 (Year: 1996).*

Kwon et al, "Detecting and Analyzing Insecure Component Usage", ACM, pp. 1-11 (Year: 2012).*

Chistyakov et al, "On Development of a Framework for Massive Source Code Anaysis Using Static Code Analyzers", ACM, pp. 1-3 (Year: 2017).*

Su et al, " Exploiting a Cloud Framework for Automatically and Effectively Providing Data Analyzers", IEEE, pp. 231-236 (Year: 2017).*

"International Search Report and Written Opinion of the ISA, dated Mar. 25, 2019, for application No. PCT/US18/65252."

* cited by examiner

SYSTEM AND METHOD FOR PHYSICAL MACHINE MONITORING AND ANALYSIS

CROSS-REFERENCE TO RELATED APPLICATIONS

This application claims the benefit of U.S. Provisional Application Ser. No. 62/597,847, filed on 12 Dec. 2017, which is incorporated in its entirety by this reference.

TECHNICAL FIELD

This invention relates generally to the machine monitoring field, and more specifically to a new and useful system and method for retrofitting machines with monitoring capabilities in the machine monitoring field.

BACKGROUND

Typical systems and/or methods for physical machine monitoring and/or analysis may require significant customization to be adapted to work with a proprietary interface of a particular physical machine, and/or may risk interfering with operation of the physical machine. Further, many such interfaces do not directly provide the information desired by users of such systems and/or methods. Thus, there is a need in the machine monitoring field for an improved system and method for physical machine monitoring and analysis.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
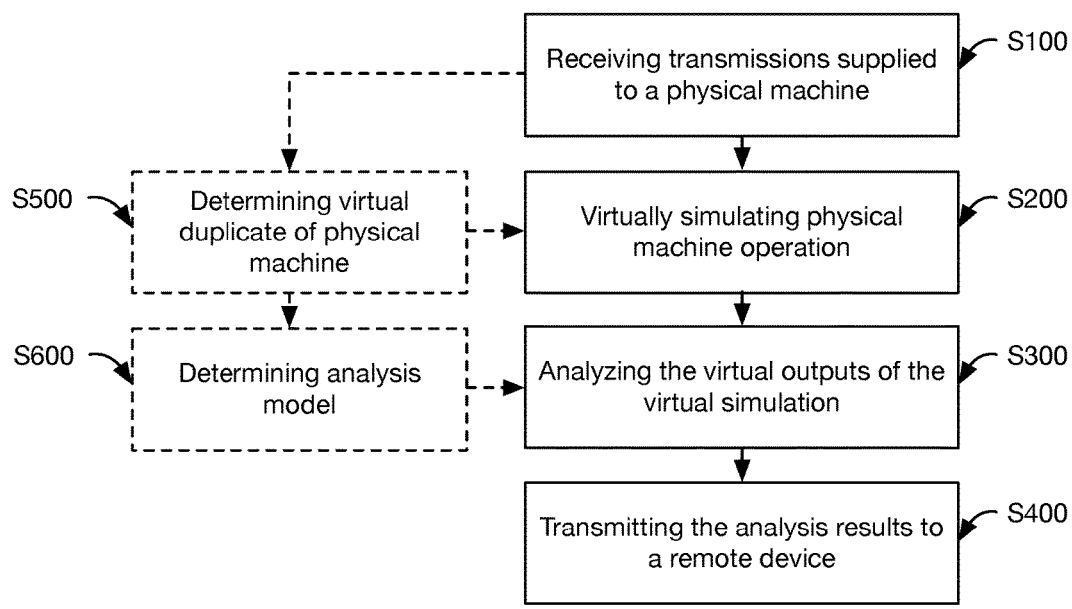
FIG. 1 is a schematic representation of the method.

As shown in FIG. 1, the machine monitoring method preferably includes: receiving packets supplied to a physical machine S100; virtually simulating physical machine operation using a digital duplicate of the physical machine and the packets S200; analyzing the virtual outputs of the virtual simulation S300; and/or transmitting the analysis results to a remote device S400. The method can optionally include determining the digital duplicate of the physical machine S500, determining an analysis model for the virtual outputs of the digital duplicate S600, determining digital component modules, and/or determining digital analysis modules.

The method preferably functions to retrofit existing physical machines with operational monitoring and continuous process improvement capabilities. The physical machines are preferably machines that lack operational monitoring and analysis capabilities (e.g., low-intelligence machines, "dumb" machines, narrow AI machines, reactive machines, etc.), but can additionally or alternatively include any suitable machines. In a specific example, the physical machines can be industrial manufacturing machines, such as sewing machines, stamps, and cutting machines.

The method is preferably performed by an on-premises system physically connected to the physical machine, but can be performed by an on-premises system remotely located from the physical machine, a remote computing system (e.g., off-premises), or by any suitable system. The method is preferably continuously performed in real- or near-real time, but can be periodically performed, performed according to a schedule, performed in response to receipt of an execution command (e.g., from a user device or central management system), or performed at any other suitable time.

Figure 4:
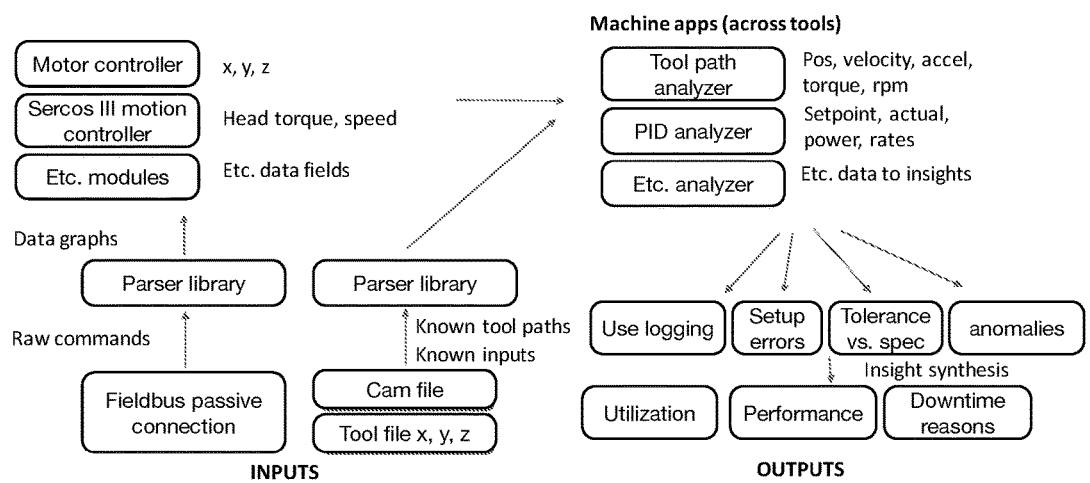
FIG. 4 is a specific example of the system.

As shown in FIG. 4, the system can optionally include: a data analyzer, a remote computing system, a database of digital component modules, digital analysis modules, digital machines (e.g., including a set of linked digital components), digital analysis models (e.g., analysis graph), recognition modules (e.g., that recognize a digital component module based on the received packets), or any other suitable module.

Variants of the method can confer benefits over conventional systems. First, variants of the method can have low processing power requirements. This is because the physical machine's digital duplicate mirrors the physical machine's component control systems (e.g., only requires as much processing power as that used by the physical control systems), and because the physical machine's component control systems are typically low-power processors (e.g., microcontrollers).

Second, variants of the method can minimize processing power (as discussed above) and/or minimize data storage (e.g., by discarding low-level, raw data and storing high-level data abstractions), which can enable small, on-premises footprint retrofits, which can be useful in applications with limited physical space (e.g., a factory floor), in applications where information security is an issue, where there is no IT infrastructure, or where the WAN connection's bandwidth is consumed by higher-priority data.

Third, variants of the method can minimize data storage requirements and/or the data bandwidth required to transmit analysis results by converting high frequency low-level data (e.g., the raw packets) to low frequency, high-level derivative data. These variants can further reduce the requisite storage and bandwidth by storing the high-level derivative data in a low-memory form factor (e.g., in binary).

Fourth, variants of the method can increase response speed by leveraging deterministic analyses. Fifth, variants of the method can minimize machine performance by being a read-only system and/or passively extracting the data. However, the system and method can confer any suitable set of benefits.

Receiving packets supplied to a physical machine S100 functions to obtain data about machine operation. This machine operation data can be used to determine the current state of the physical machine, and can optionally be used to identify the physical components within the physical machine.

The physical machine preferably includes one or more physical components and a controller, but can additionally or alternatively include a system bus connecting the controller to the physical components (and/or the physical components to each other) or any other suitable subsystem.

The physical component is preferably a mechanical subsystem that performs a predefined set of tasks. The physical component can include one or more: actuators (e.g., that generates a component output or performs a task), component control systems (e.g., that controls actuator operation based on instructions addressed to the physical component), sensors (e.g., that monitors actuator operation), or other subcomponent. The physical component is preferably identified by a locally unique address (e.g., within the packet header), but can be otherwise identified. The physical component is preferably associated with one or more outputs or operational states. Examples of the outputs or operational states include: actuator motion (e.g., kinematics, such as velocity, acceleration, etc.), actuator or end effector position (e.g., linear position, angular position), applied force (e.g., pressure, torque), emitted sound parameters (e.g., pitch, volume), temperature parameters (e.g., temperature, duration), emitted light parameters (e.g., color, brightness, image, text), or any other suitable output or operational state. Examples of the physical component include: switches (e.g., emergency stop buttons, dead man switches), motors, pedals, displays, or any other suitable physical component.

The controller functions to control one or more physical components based on a control program. In particular, the controller can generate transmissions (e.g., instructions, such as control packets) for the physical components based on the control program, physical component feedback, sensor feedback, or any other suitable input. The controller can be an industrial control system, a master SCADA control system, or be any other suitable controller. The controller preferably transmits the transmissions (e.g., control packets) to the respective physical component over the system bus, but can alternatively or additionally transmit the transmissions over a wireless LAN (e.g., Bluetooth network, WiFi network, etc.), and/or through any other suitable communication channel. The transmissions are preferably addressed to the respective, individual physical component, but can be otherwise addressed. The transmissions preferably include control instructions, but can additionally or alternatively include processing instructions (e.g., wherein the component can process data according to the processing instructions), secondary endpoint information (e.g., a second component's address), and/or any other suitable information. The control instructions can be in the form of: power modulation (e.g., adjusting the supplied voltage and/or current), binary signals, machine instructions, assembly instructions, and/or in any suitable format. The control instructions are preferably provided in a known (e.g., standard) protocol, but can alternatively be in a proprietary protocol or any other suitable protocol.

The system bus functions as an intra-machine network connection, and communicates data (e.g., packets) and/or power between the controller and the physical component(s). The system bus preferably defines one or more communications links (e.g., real-time and/or deterministic communications links) between the controller and the physical components. The system bus is preferably a real-time, deterministic bus (e.g., fieldbus, such as standardized in IEC 61158), but can be any other suitable bus. The system bus can be a parallel bus, serial bus, or any other suitable bus. The system bus is preferably a wired network communication system (e.g., including one or more wired communication links), but can additionally or alternatively include wireless communication links. Examples of the system bus include: Ethernet, EtherCAT, VARAN, GPIB, Bitbus, RS-232, Centronics, IEEE 1284, RJ11, USB, and/or any other suitable network communication system.

The received packets are preferably control packets, but can additionally or alternatively be return packets generated by the physical component or be any other suitable packet. The return packets can be addressed to the controller, a secondary physical component, or to any suitable endpoint. The return packets can include: sensor measurements (e.g., generated by component sensors), packet receipt confirmation, command execution confirmation, error codes, or any other suitable information.

Receiving the packets preferably includes intercepting (e.g., listening, capturing, sniffing) and logging (and/or otherwise acting upon, such as buffering, storing, duplicating, streaming, etc.) the packets from the system bus with a data analyzer (e.g., tap, such as a passive tap). However, the packets can be otherwise received. The data analyzer can be hardware (e.g., a microprocessor, a microcontroller, a FPGA, an ASIC, a CPU, a GPU, etc.) or software that reads packets transmitted along the bus (e.g., transmitted from the controller to the physical components, or from the physical components to the controller), but can be any other suitable agent. The data analyzer is preferably connected to a passive system bus splitter, but can be connected to the controller or be otherwise connected to the system. The data analyzer is preferably passive and does not transmit packages to the system bus (e.g., the packets are allowed to propagate through the system bus in the same manner as if the data analyzer were not present), but can alternatively be active (e.g., query physical components or the controller for information, such as the physical component identity). The packets are preferably continuously received in real- or near-real time (e.g., as the packets are being transmitted), but can be received in batches, randomly sampled, or with any other suitable timing (e.g., at any suitable frequency). The packets are preferably received at a high frequency (e.g., more than a threshold amount, such as 100, 300, 1000, 3000, 10,000, 30,000, 100,000, 300,000, 10-100, 100-1000, 1000-10,000, 10,000-30,000, 30,000-100,000, or 100,000-1,000,000 packets per second, etc.), but can additionally or alternatively be received with any other suitable frequency. The data analyzer preferably receives every packet generated by the machine, but can alternatively receive every Nth packet, receive random packets, or receive any suitable packet. The packets can be cached for a predetermined time window (e.g., and discarded thereafter), stored until they are consumed by the digital duplicate, stored until they are transmitted to the remote system, or otherwise managed. The packets can be stored in time-series within a common buffer, within a buffer specific to the packet address and/or respective digital component module, or otherwise stored.

Virtually simulating physical machine operation using a digital duplicate of the physical machine and the packets S200 functions to determine the current operational state of the physical machine and/or each physical component. The virtual simulation is preferably performed in real- or near-real time, as the packets (e.g., instructions) are received, but can alternatively be performed asynchronously.

The virtual simulation is preferably executed by the on-premises system, but can be performed by a remote computing system (e.g., wherein the raw packets, derivatory data determined from the raw packets, or other information can be transmitted to the remote computing system), a local device (e.g., a user device, which can pull the cached raw packets or derivatory data from the on-premises system), or by any suitable device.

Figure 2:
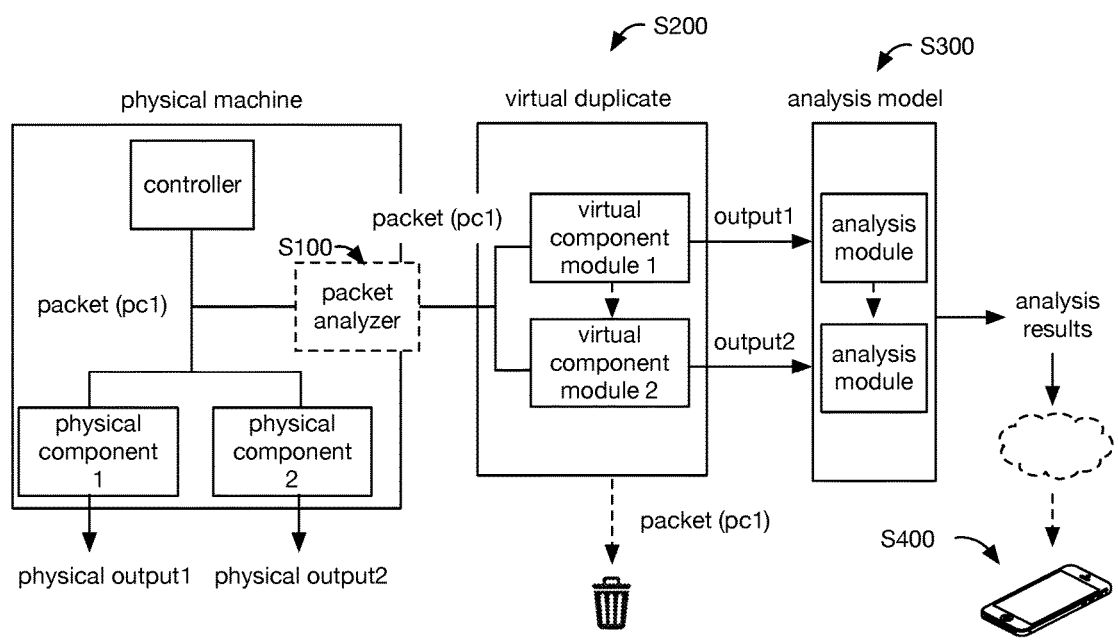
FIG. 2 is an example system for performing the method.

Virtually simulating the physical machine can include feeding the packets to the digital duplicate, wherein the digital duplicate virtually re-creates the physical machine operation (example shown in FIG. 2). For example, the virtual simulation of a stamping machine preferably stamps at the same time (and/or with the same operation parameters, such as simulated pressure) as the physical stamping machine. In one variation, feeding the packets to the digital duplicate can include: transmitting (e.g., broadcasting) the packets to the digital duplicate, wherein the corresponding digital component module (e.g., digital component module that shares the physical component's address) extracts packets addressed to the physical component from the transmitted packet stream and simulates physical component operation based on the packet. Alternatively or additionally, virtually simulating the physical machine can include feeding the packets or signals to a component event detector and/or machine event detector (discussed below). However, the physical machine can be otherwise virtually simulated. The virtual output of the digital component module can be: fed to secondary digital component modules (e.g., when the physical machine includes multiple physical components chained in series); compared to the output of the physical component module (e.g., extracted from subsequently received packets); treated as an output of the digital duplicate; or otherwise used. In a second variation, feeding the packets to the digital duplicate can include: identifying the digital component module associated with a packet (e.g., based on the packet address), and transmitting the packet directly to the identified digital component module for physical component simulation. However, the physical machine can be otherwise virtually simulated.

The digital duplicate of the physical machine functions to virtually simulate the physical machine by ingesting the same packet data and outputting the same outputs (e.g., data outputs, physical outputs, etc.) as the physical machine.

In a first variation, the digital duplicate includes a single model representing the entire physical machine, wherein the single model ingests all packets (addressed to one or more physical components) and outputs one or more outputs. This model can include: neural networks, rules, decision trees, Bayesian methods (e.g., Naïve Bayes, Markov), genetic programs, support vectors, kernel methods, probabilities, deterministics, or any other suitable module. The model can be generated using supervised training (e.g., wherein the training data can include the packets associated with observed outputs of the physical machine), unsupervised training (e.g., based on the packets), reinforcement learning (e.g., based on the packets and observed outputs), or otherwise generated.

Figure 3:
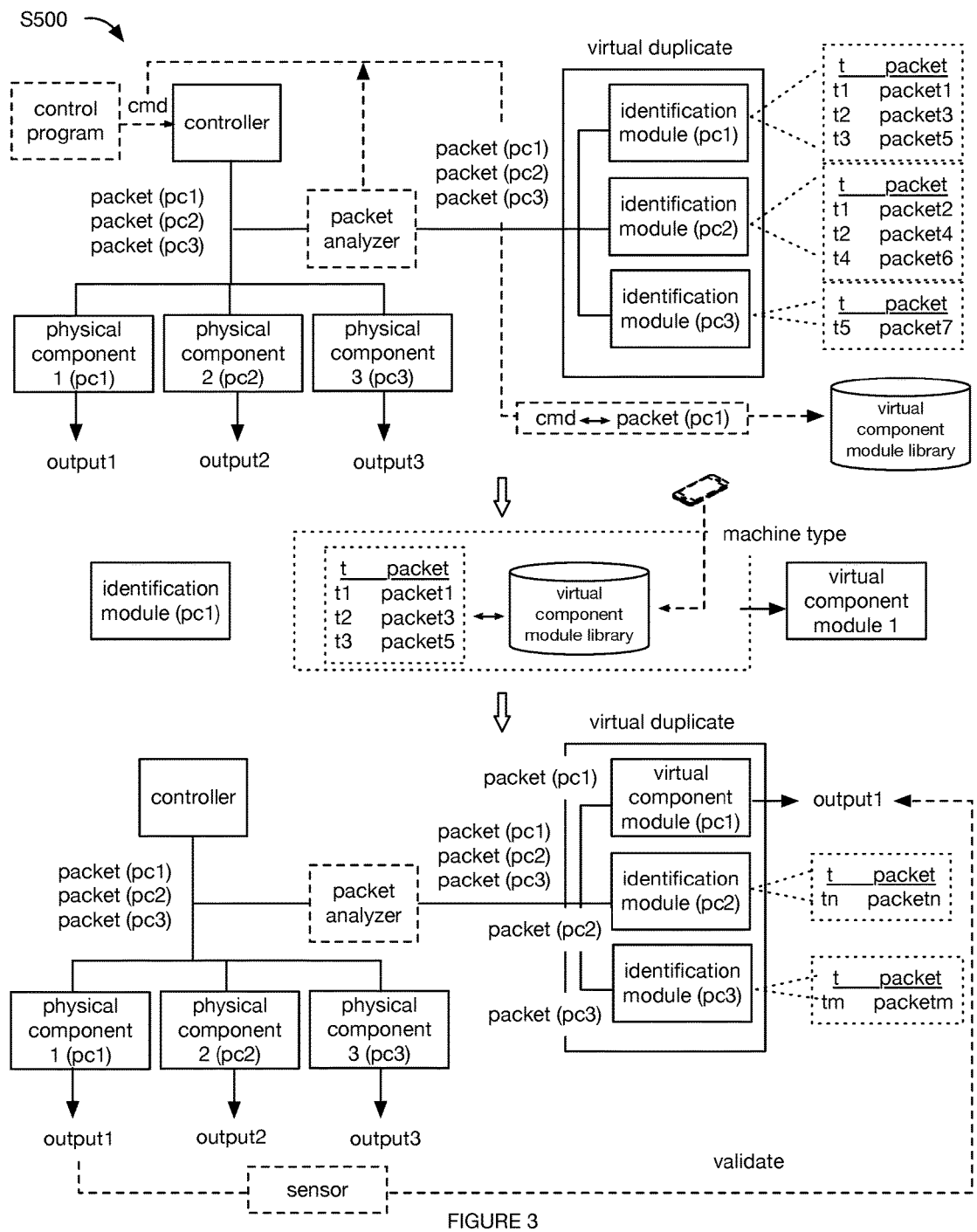
FIG. 3 is an example of determining the digital duplicate.

In a second variation, the digital duplicate includes one or more digital component modules coupled together in the same manner as physical component module (example shown in FIG. 2 and FIG. 3). In this variation, each digital component module preferably represents a physical component within the physical machine (e.g., with a 1:1 ratio or match, such as a one-to-one association between each digital component module and the corresponding physical component it represents). However, the digital component module can additionally or alternatively represent a subset of a physical component, multiple physical components, or any suitable portion of the physical machine.

The digital duplicate preferably includes digital component modules connected with a set of digital couplings, but can be otherwise configured. The digital duplicate preferably includes digital component modules for each active physical component that receives a command (e.g., on the system bus), but can alternatively or additionally include digital component modules for passive physical components (e.g., that do not receive commands), digital component modules for a subset of the active physical components, or for any suitable set of physical components. In one example, the digital duplicate of a sewing machine can include a digital component module for the motor, but lack a digital component module for the needle.

The digital component module preferably shares the same address with the physical component, ingests the same packets as the physical component, and outputs a virtual representation of the physical component's output. For example, the digital duplicate of a motor can ingest motor control packets and output the motor position (e.g., angular position). However, the digital component module can have a different address (e.g., wherein the digital duplicate can include a translator that translates the physical component address to the digital component module address), be re-assigned the physical component address, or otherwise adjusted. The digital component module is preferably generic and shared across multiple digital duplicates of different physical machines, but can alternatively be custom for the instantaneous physical machine.

The virtual representation of the physical component's output (virtual output) is preferably a value (e.g., x, y coordinates associated with an actuator's current position in a digital coordinate system), but can alternatively or additionally be a vector, a 2-D or 3-D digital rendering, or otherwise represented. The virtual output is preferably output on the same coordinate system as the physical component, but can alternatively or additionally be output on the physical machine's coordinate system or a different related or unrelated coordinate system.

Each digital component module preferably includes an internal control loop that processes the packets (e.g., operation instructions) into the virtual outputs. However, the packets can alternatively be processed by an external system or otherwise processed. The control loop is preferably executed synchronously (e.g., in real-time, as packets are received), but can alternatively be executed asynchronously (e.g., based on available processing power, module criticality, module output frequency, a predetermined rule, etc.), or executed at any suitable time. The control loop can be a matching model (e.g., that matches control instructions to outputs), physics model (e.g., that converts the control instructions to motion, and determines the output based on the motion), the same control loop stored by the physical component's controller, or use any other suitable model, rules, or set of equations.

The control loops for multiple digital component modules are preferably independently executed by the same processing system, but can alternatively be executed in a batch, executed in parallel, executed in series, executed by different processing systems, or otherwise executed. In one variation, the processing system can have specific memory or processor segments allocated to each digital component module. In a second variation, the processing system memory and/or processing power can be dynamically allocated based on the digital component module being activated (e.g., receiving packets). However, the processing resources can be otherwise allocated.

The digital couplings function as a virtual representation of the relationships between physical components. The digital couplings can represent: digital connections (e.g., wherein an upstream component feeds its output to a downstream component), physical connections (e.g., wherein the position, operation parameter value, or operation mode of one physical component affects the operation of a second physical component), or represent any other suitable connection. For example, the digital duplicate of a physical sewing machine with a pedal controlling a motor's speed can include a digital pedal module that outputs a pedal position, signal (e.g., voltage), or packet, wherein the digital pedal module is virtually connected to a digital motor module that ingests the digital pedal module output and outputs the motor speed and/or angular position.

All or some of the virtual outputs of the digital component modules and/or digital duplicate can be cached for a predetermined time window (e.g., and discarded thereafter), stored until they are analyzed by the analysis model, stored until they are transmitted to the remote system, or otherwise managed. When a subset of the virtual outputs is stored, the stored virtual outputs can be those output by the final digital component module in a series of digital component modules, be virtual outputs from a preselected set of digital component modules (e.g., selected based on the physical machine type, based on the data required for the analysis modules, manually selected, empirically selected, etc.), or otherwise determined.

Analyzing the virtual outputs S300 preferably functions to reduce the high-frequency, low-level packets to low-frequency, high-level information. The high-level information preferably has a low frequency (e.g., number of entries, such as entries corresponding to high-level events, per unit time), such as a frequency below a threshold frequency (e.g., less than one event every 0.001, 0.01, 0.1, 1, 2, 5, 10, 20, 50, 100, 200, 500, 1000, 10,000, 100,000, 0.001-0.1, 0.1-1, 1-3, 3-10, 10-30, 30-100, 100-300, 300-1000, or 1000-100,000 s, etc.) and/or much lower than the packet frequency (e.g., less than the packet frequency by a factor of at least 10, 100, 1000, 3000, 10,000, 20,000, 50,000, 100,000, 300,000, 1,000,000, 1-30, 30-300, 300-3000, 3000-10,000, 10,000-30,000, 30,000-100,000, 100,000-300,000, or 300,000-10,000,000, etc.). The analysis is preferably performed in real- or near-real time, as the virtual outputs are generated, but can alternatively or additionally be performed asynchronously or in any suitable order. Additionally or alternatively, the packets themselves can be directly analyzed, without passing through S200.

The analysis is preferably performed using one or more analysis models, but can be manually or otherwise analyzed. The analysis model can be determined based on the digital component modules within the digital duplicate, the physical machine type, manually specified, or otherwise determined. The analysis model can be executed by the same processing system as that executing the virtual simulation, by a different processing system (e.g., a remote computing system, a SCADA system), or by any suitable system.

Each analysis model preferably includes one or more analysis modules (example shown in FIG. 2), which can execute independently or be linked (e.g., wherein the output of one analysis module is passed to a second analysis module). In one example, the set of analysis modules are organized into a graph. In a second example, the analysis module can include a neural network or other model. However, the analysis model can have any other suitable data structure.

In one variation, all virtual outputs are fed into the same analysis model, wherein the constituent analysis modules can select and ingest the virtual outputs specific to that module. In a second variation, different virtual outputs are fed into different analysis modules of the analysis model. However, the virtual outputs can be otherwise supplied to analysis modules of the analysis model.

The analysis module functions to output a limited subset of derivatory data (e.g., derivative data, such as data derived from the low-level information such as the received packets). This derivatory data can be used as-is, be passed into downstream analysis modules, and/or otherwise used. Each analysis module preferably includes an internal control loop, specific to the analysis associated with the analysis module, that processes the virtual outputs of a predetermined set of digital component modules. However, the virtual outputs can be processed by an external system or otherwise processed.

Multiple analysis modules' control loops are preferably independently executed by the same processing system, but can alternatively be executed in a batch, executed in parallel, executed in series, executed by different processing systems, or otherwise executed. In one variation, the processing system can have specific memory or processor segments allocated to each analysis module (e.g., wherein new derivatory data can overwrite old derivatory data). In a second variation, the processing system memory and/or processing power can be dynamically allocated based on the analysis module being activated (e.g., the analysis module that ingests the virtual outputs being generated). However, the processing resources can be otherwise allocated. The analysis module is preferably generic and shared across multiple digital duplicates of different analysis models, but can alternatively be custom for the instantaneous analysis model.

The analysis module can detect events and/or otherwise determine that events have (or are likely to have) occurred (e.g., such that the analysis model is an event-driven model), preferably events associated with physical machine operation, summarize component operation, summarize machine operation, and/or generate any other suitable higher-level derivatory data. The derivatory data is preferably a value or an array, but can alternatively be a secondary virtual simulation or any other suitable data structure. Examples of the derivatory data output by analysis modules can include: geofence ingress and/or egress (e.g., wherein the geofence is defined relative to the physical machine coordinates, digital duplicate coordinates, or digital component module coordinates), path parameters (e.g., absolute path length, apparent path length, etc.), part completion (e.g., detecting a product completion event), part failure (e.g., rejection, such as detecting a product rejection event), count, component state, uptime, number of operation sessions, failure rate, whether actual output (from virtual simulation) meets the expected output (determined from control program command), variation between actual and expected, error codes, deviations from typical operation (e.g., wherein typical operation is determined from historically received packets, historic virtual simulation, etc.), output rate (e.g., throughput), material loading events (e.g., associated with loading and/or reloading of material for physical machine operation, such as raw material for product manufacturing), and/or any other suitable data.

In one variation, the system includes a set of component event detectors (state detectors) corresponding to each physical machine component. The component event detectors preferably output a binary output for a single component (e.g., binary component states), but can alternatively or additionally output states for multiple components, output a continuous output (e.g., one of a continuum of potential values), or output any suitable output. The component event detectors preferably: receive a time series of data packets from the data analyzer (and/or a time series of signal changes) for the respective component(s); detect component events from the signals (e.g., by filtering the signals with an event-associated filter for the component); and determine the machine event from the set of detected component events. The component event detector (event model) can be a filter (e.g., state filter), a heuristic model, a classification model, a regression model, a deterministic model, a neural network, a fuzzy logic model, or be any other suitable model. The component event detector is preferably specific to the component, but can alternatively be specific to a set of components, specific to the component-machine combination, specific to the component function, and/or be otherwise related to the component. Component event detectors can be shared across multiple virtual machine models when the respective physical machines include the respective physical component, or be otherwise shared. The machine event detector can be a neural network (e.g., CNN, RNN, clustering method, etc.), a classifier, a deterministic model, a pattern-matching model, or be any suitable model. The machine event detector is preferably specific to the individual machine, but can alternatively be specific to the machine type (e.g., SKU number, brand, make and model, etc.), specific to the machine function (e.g., all sewing machines share a model, etc.), and/or be otherwise related to the machine.

The component event filters and machine event classifier(s) can be executed by: the on-premises system (e.g., the data analyzer, the controller, etc.), a remote computing system, and/or by any suitable system. In one variation, the component event filters and the machine event classifiers are executed by the on-premises system (e.g., the data analyzer, analysis device), wherein the detected machine events are transmitted to the remote computing system for subsequent monitoring and analysis. In a second variation, the component event filters are executed by the on-premises system (e.g., the data analyzer), wherein the detected component states or events are transmitted to the remote computing system for machine event analysis and detection. In a third variation, the data streams (and/or state changes) are transmitted to the remote computing system, wherein the remote computing system detects the component event filters and the machine event detector. However, the machine events can be otherwise determined.

In some embodiments, the physical machine includes comprises an access control device (e.g., door, barrier, lock, latch, etc.) and/or access sensor (e.g., door state sensor, presence sensor such as a line of sight sensor, weight sensor, optical sensor, etc.) associated with a region for material loading (e.g., portion of the physical machine configured to retain the material). The derivatory data can include time-dependent access state information (e.g., door open, region entered, etc.), such as the amount of time for which the access control device was open, and/or material state information (e.g., material remaining, material retention region full, material retention region empty, etc.). The derivatory data can additionally or alternatively include information determined based on this information. For example, based on determining that the material loading region has been accessed and/or accessible (e.g., in embodiments in which the region is not accessible during normal machine operation) for more than a threshold period of time (e.g., 1, 3, 10, 20, 60, 120, 200, 500, 1000, 0.1-1, 1-10, 10-30, 30-90, 90-200, 200-500, 500-1000, or 1000-10,000 seconds), determining derivatory data can include determining that a material loading event has occurred.

All or some of the derivatory data (analysis results) from the analysis modules or analysis model can be cached for a predetermined time window (e.g., and discarded thereafter), stored until they are analyzed by a downstream analysis module, stored until they are transmitted to a remote system, or otherwise managed. When a subset of the derivatory data are stored, the stored derivatory data can be those output by the final analysis module in a series of analysis modules, be derivatory data from a preselected set of analysis modules (e.g., selected based on the physical machine type, based on the data required for downstream analysis modules, manually selected, empirically selected, etc.), or otherwise determined. The analysis results can be stored as: a single value (e.g., the most current value), a time series (e.g., values with associated absolute or relative timestamps), or otherwise stored. The analysis results data structure can be specified by the analysis module, the amount of memory allocated to the analysis module, manually specified, or otherwise specified.

In some embodiments, S300 includes classifying physical machine state (e.g., operation state) during one or more time intervals, preferably consecutive intervals of a predetermined (e.g., equal) duration (e.g., 0.1, 0.25, 0.5, 1, 2, 5, 10, 20, 50, 100, 0.1-1, 1-10, or 10-100 minutes). For example, each time interval can be associated with a classification such as: normal operation, jammed, loading material, broken component, and/or any other suitable classifications.

Transmitting the analysis results to a remote device S400 functions to present the derivatory data to a user (example shown in FIG. 2). The analysis results are preferably transmitted by the on-premises system, but can be transmitted by any suitable system. The remote device can be a proximal mobile device (e.g., smartphone, tablet, etc.), an on-premises remote server system, an off-premises remote server system, or be any other suitable computing device. The analysis results can be broadcast, unicast, multicast, returned (e.g., in response to a request), retrieved, flooded, or otherwise transmitted. The analysis results can be transmitted: in real-time (e.g., as the derivatory data is being generated), in response to receipt of a request from the remote device, when sufficient bandwidth is available on a communications system (e.g., on the field bus, on a wireless communication system, etc.), at a predetermined time (e.g., scheduled for factory downtimes), or transmitted at any other suitable time. The analysis results can be transmitted over: a wireless communications system shared by the analysis system (e.g., on-premises system) and remote device, such as Bluetooth, WiFi, cellular, or mesh; a wired connection, such as the field bus or a separate Ethernet connection; or transmitted using any other suitable communications system.

The analysis results can be subsequently presented to the user, used to generate notifications (e.g., sent to a managing entity or device in response to a combination of the derivatory data satisfying a predetermined condition), used to generate improvement recommendations, or otherwise used. For example, automatically generating improvement recommendations can include: identifying a first and second similar digital duplicate and/or physical machine (e.g., based on similar constituent digital component modules and/or digital couplings) associated with the same or different managing entities; comparing the respective performance metrics, determined based on the analysis results output by the respective analysis models; identifying a higher-performing physical machine based on the performance metrics (e.g., the physical machine with a higher metric value, lower failure rate, etc.); determining an operation difference between the higher-performing and lower-performing machines based on the analysis results (e.g., upstream analysis results, such as motor velocity); and sending a recommendation to the lower-performing managing entity based on the higher-performing physical machine's operation parameters (e.g., recommending use of the higher-performing physical machine's operation parameters). However, the analysis results can be otherwise used.

The method can optionally include determining the digital duplicate of the physical machine S500, which functions to generate the model used to virtually simulate the physical machine. The digital duplicate is preferably automatically generated (e.g., based on the packets, based on the manually-specified machine type, etc.), but can optionally be semi-automatically generated (e.g., most of digital duplicate is automatically generated, then query a user to interpret or add modules for unknown signals), manually generated (e.g., the user manually selects digital component modules and digital connections), or otherwise generated. The digital duplicate can be determined by: the on-premises system, a remote device, a remote computing system (e.g., wherein raw information, such as raw packets, can be transmitted to the remote computing system and the digital duplicate can be pushed to the on-premises system), or by any other suitable computing system. The digital duplicate can be determined by: a master controller executing on the determining system; individually, by the digital component module executing on the determining system; individually, by a listening module (identification module) executing on the determining system; or otherwise determined.

The digital duplicate is preferably determined based on the received packets, but can additionally or alternatively be determined based on a machine type (e.g., manually-specified, determined based on sensor measurements, determined based on packet characteristics, etc.), based on signals sampled by on-board sensors, or based on any other suitable set of information. For example, the packets can be used to identify the components within the physical machine (e.g., based on the packet types, transmission frequencies, packet address such as an origin address and/or destination address, packet information, etc.), determine how the components are related or coupled together (e.g., based on the packet sources and endpoints, call and response packet timing, etc.), or otherwise used to generate the model.

The digital duplicate is preferably generated using a library or database of known, predetermined digital component modules, but can be manually created, empirically created (e.g., wherein the output of the digital duplicate or digital component module can be compared against physical machine or physical component outputs), or otherwise generated.

The digital component modules are preferably associated with: an internal control loop (e.g., model configured to interpret the addressed packets) and a predetermined packet fingerprint or set of packet stream characteristics (e.g., protocol, packet length, transmission frequency, OUI, etc.), but can additionally or alternatively be associated with a predetermined set of analysis modules, a predetermined set of digital connections and/or related digital component modules, machine type(s), address(es), or any other suitable information. The digital component modules can be manually generated, automatically generated, or otherwise generated. In a first example, the digital component module can be generated using: a packet stream supplied to the physical component and sensor measurements of the physical component output (e.g., using a neural network, etc.). In a second example, the digital component module is generated using: the control program's command (e.g., used as a proxy for the intended component output) and resultant control packets, wherein the control packet characteristics can be mapped to the intended component output (example shown in FIG. 3).

However, the digital component modules can be otherwise generated.

Automatically generating the digital duplicate can include: receiving packets transmitted by the physical machine (e.g., on the field bus), identifying packets addressed to an unknown component, caching the identified packets, identifying a digital component module based on the cached identified packets, and adding the digital component module to the digital duplicate (example shown in FIG. 3). However, the digital duplicate can be otherwise generated. This can optionally include assigning the previously-unknown component's address to the digital component module. The unknown component is preferably a physical component without a predefined digital counterpart (e.g., digital component module) in the digital duplicate, but can be otherwise defined. One or more versions of the digital duplicate can be concurrently generated based on the same (or different) packet stream, wherein the best digital duplicate can be converged upon, selected based on a metric (e.g., accuracy as compared to the physical component's actual output), or otherwise identified and used.

Identifying the digital component module functions to identify digital component modules corresponding to the physical components of the physical machine. In a first variation, the digital component module is identified based on the packet address, wherein the packet address is associated with a specific physical component and corresponding digital component module.

In a second variation, identifying the digital component module includes: matching characteristics of the identified packets to known patterns associated with predetermined digital component modules and physical components (e.g., packet fingerprints associated with digital component modules). The digital component module can be further determined based on a physical machine type or class (e.g., manually determined, determined based on a set of sensor measurements, etc.), wherein the physical machine type can be used to limit the search space (e.g., used to filter or weight higher-probability digital component modules), and/or based on other information. Characteristics that can be used to identify the component include: packet signaling protocol, packet length, packet address, temporal characteristics of packet transmission (e.g., transmission frequency, relationship to other components' packet transmissions, etc.), whether the packet is digital or analog, whether the packet is a command packet or response packet, packet content (e.g., interpreted based on a recognized, known signaling protocol), or otherwise determined.

The characteristics can be matched (or digital component module otherwise identified) by an identification module, wherein the identification module can use: classification (e.g., parametric, nonparametric), clustering, ensemble learning, multilinear subspace learning, real-valued sequence labeling, regression algorithms, sequence labeling, template matching, or any other suitable method. The identification module can be: manually generated, automatically generated, empirically determined, or otherwise determined. In one example, the identification module is automatically generated by: caching packets addressed to a prior, known physical component; extracting a packet fingerprint based on the cached packet(s); determining a digital component module for the physical component; and associating the packet fingerprint with the digital component module. However, the identification module can be otherwise generated. However, the packet stream can be otherwise matched to a digital component module.

The selected digital component module can optionally be validated using the physical component's output packets, sensor measurements characterizing physical component output (e.g., sensors retrofitted onto the physical machine), manually validated, or otherwise validated.

In one example of the second variation, the digital duplicate can be initially populated by a set of identification modules (e.g., an identification module for each unique packet address), wherein each identification module eventually selects a digital component module replacement based on the respectively addressed packet stream's characteristics. In a second example of the second variation, an identification module can listen to the entire packet stream, and select one or more digital component modules based on the packet stream as a whole.

In a third variation, identifying the digital component module includes: recognizing the packet protocol; interpreting the packet, based on the recognized protocol, into a set of commands; and identifying the digital component module based on the command characteristics (e.g., command type, command call, command frequency, combination of commands, command patterns, etc.). The digital component module can be identified by a similar identification module as that discussed above (e.g., trained on command characteristics instead of packet characteristics) or be otherwise identified.

In a fourth variation, identifying the digital component module includes: receiving sensor signals indicative of physical component operation and identifying the digital component module associated with characteristics of the sensor signals (e.g., with the sensor measurement fingerprint). The digital component module can be identified by a similar identification module as that discussed above (e.g., trained on signal measurement characteristics instead of packet or command characteristics) or be otherwise identified.

In a fifth variation, identifying the digital component module includes: supplying the packet stream to a neural network or other module, wherein the neural network can output an identifier for the physical component based on the packet stream. Alternatively or additionally, the neural network can be specific to a physical component or digital component module, wherein the neural network outputs a decision on whether the packet stream is indicative of the associated physical component or digital component module. However, the digital component modules within the digital duplicate can be identified from a schema associated with a vendor for the physical machine, identified based on the packet protocol used (e.g., wherein the protocol is only used with a limited set of physical components), identified based on data supplied by the physical machine's controller (e.g., metadata, component name), or otherwise determined.

Generating the digital duplicate can optionally include determining the digital couplings between the digital component modules. The digital couplings can be determined: automatically, semi-automatically, manually, empirically, iteratively, or otherwise determined. The digital couplings can be determined based on: the machine type (e.g., wherein the machine type is associated with a predetermined set of digital couplings), different component packets' timing, packet types (e.g., confirmation packet), other digital component modules, or any other suitable information.

In a specific example, determining the digital duplicate can include: listening to the packet stream; creating a new node for each unique packet address, each node representative of a physical component and initially populated with an identification module; at each identification module, receiving packets addressed to the respective address, extracting packet characteristics from the received packet stream, and identifying a predetermined digital component module based on the packet characteristics; and replacing the identification module with the identified digital component module (e.g., after a threshold confidence level has been surpassed).

Determining the analysis model functions to determine the set of analyses to run on the virtual simulation. The analysis model can be manually, semi-automatically, automatically, or otherwise determined. The analysis model is preferably generated by a remote computing system and stored on the on-premises system, but can alternatively be otherwise generated and stored on the remote computing system, or otherwise generated or stored. The analysis model and/or modules association with a machine type, digital duplicate, digital component module, and/or other data structure can be empirically determined, crowdsourced, learned, or otherwise determined. Each analysis module can be manually generated, automatically generated (e.g., based on user feedback), or otherwise determined.

In a first variation, analysis modules pre-associated with a given digital component module can be added to the analysis model. For example, digital motor modules are associated with a rotation count (analysis module). In a second variation, a predetermined analysis model is associated with a given machine type. For example, the digital motor module (digital component module) within a sewing machine (machine type) can be associated with a stitch counter (analysis module). In a third variation, analysis modules are manually selected and/or linked together to form the analysis model. In a fourth variation, a predetermined set of analysis modules can be associated with a given set of virtual outputs. However, the analysis model can be otherwise determined.

In some embodiments, the data analyzer (e.g., packet analyzer) includes a network tap and an analysis device. The network tap is preferably a passive tap, such as wherein transmissions (e.g., packets) on the network are preferably not substantially altered by the presence and/or action of the tap (e.g., wherein the transmissions propagate on the network without or substantially without delay), but can additionally or alternatively include an active tap (e.g., which captures, duplicates, and/or retransmits the packets) and/or any other suitable tap. The network tap is preferably communicably coupled to the analysis device (e.g., by a wired connection, such as an Ethernet connection). The network tap preferably transmits the packets it observes on the network to the analysis element, but can additionally or alternatively store the packets, filter the packets (e.g., prior to transmission), transmit the packets to any other suitable endpoints, and/or otherwise act upon the packets.

The analysis device is preferably a computing system (e.g., local computing system, such as a computer collocated with the network tap), but can additionally or alternatively include a remote computing system and/or any other suitable analysis elements. The analysis device preferably functions to identify, filter, and/or otherwise analyze the packets, and can additionally or alternatively transmit the packets to one or more downstream devices (e.g., remote computing system) and/or perform any other suitable functions. The packets are preferably analyzed in response to (e.g., in real-time or near real-time, such as immediately in response to) receipt by the analysis device, but can additionally or alternatively be analyzed at any other suitable time.

Identifying the packets preferably includes determining which physical component(s) the packets were transmitted to and/or from. For example, the packets can be identified based on a packet address (e.g., wherein packets including an address associated with a particular physical component are preferably determined to be associated with that component), packet content (e.g., wherein instructions for a particular type of physical component can be determined to be associated with that physical component), and/or any other suitable information.

Filtering the packets can include discarding one or more packets, saving the packets but only transmitting a subset to a downstream device such as a remote computing system, and/or filtering in any other suitable manner. The packets can be filtered based on the associated physical component (e.g., wherein packets associated with a first set of physical components are not filtered out, wherein packets associated with a second set of physical components and/or not associated with the first set of physical components are filtered out, etc.), state changes (e.g., delta filtered, such as only saving and/or transmitting packets associated with changes in physical machine state), packet content (e.g., packet type, such as keeping instruction packets, sensor measurement packets, and error packets, but filtering out all other packets; instruction type; control values and/or sensor data values, such as filtering packets including or not including values within threshold ranges such as predetermined ranges; etc.), and/or any other suitable criteria.

A person of skill in the art will recognize that the "packets" described herein can include not only Level 3 packets (e.g., packets including frames) and/or Level 2 packets (e.g., frames), but can additionally or alternatively include any other suitable communications and/or communication blocks (e.g., electronic and/or optical signals, preferably digital signals but additionally or alternatively analog signals and/or any other suitable signals), and analogously that the "data analyzer" can additionally or alternatively be configured to analyze any other suitable communication blocks.

A person of skill in the art will recognize that the elements described herein as "digital" (e.g., digital duplicates, digital components, digital analysis modules, digital machines, etc.) can additionally or alternatively include any suitable virtual elements (e.g., virtual duplicates, virtual components, virtual analysis modules, virtual machines, etc.), regardless of whether any or all such virtual elements include a digital representation.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for physical machine monitoring, comprising:
   determining a one-to-one association between a physical component and a virtual component, wherein:
      a physical machine comprises the physical component; and
      the physical component is associated with a destination address;
   at a data analyzer, receiving a set of instructions transmitted on a real-time deterministic communications network from a controller to the physical component, wherein the physical machine comprises the controller and does not comprise the data analyzer, wherein receiving the set of instructions comprises,
   for each instruction, receiving a respective frame,
      wherein the respective frame comprises the instruction and the destination address;
   for each instruction of the set:
      at the data analyzer, based on the destination address, determining that the instruction is associated with the physical component; and
      in response to determining that the instruction is associated with the physical component, associating the instruction with the virtual component based on the one-to-one association;
   in response to associating each instruction of the set with the virtual component,
      determining a simulated state of the physical component, comprising simulating operation of the virtual component based on the set of instructions,
      wherein simulating operation of the virtual component based on the set of instructions comprises simulating execution of the set of instructions; and
      based on the simulated state of the physical component, determining that an event associated with physical machine operation has occurred.

2. The method of claim 1, wherein simulating operation of the virtual component based on the set of instructions comprises, for each instruction of the set: in response to receiving the instruction, simulating operation of the virtual component based on the instruction.

3. The method of claim 1, wherein:
   a first instruction of the set is an instruction for physical component motion; and
   simulating operation of the virtual component based on the set of instructions comprises altering a simulated position of the virtual component based on the first instruction.

4. The method of claim 3, wherein, after altering the simulated position, the simulated position is substantially identical to a position of the physical component.

5. The method of claim 3, wherein determining that an event associated with physical machine operation has occurred comprises:
 after altering the simulated position, determining that the simulated position is within a geofence associated with product rejection; and
 based on determining that the simulated position is within the geofence, determining that a product rejection event has occurred, wherein the event is the product rejection event.

6. The method of claim 1, wherein:
 the physical machine comprises an access control device associated with a region for material loading;
 determining the simulated state comprises determining that the region for material loading has been in an accessible state for more than a threshold period of time; and
 based on determining that the region for material loading has been in the accessible state for more than the threshold period of time, determining that a material loading event has occurred, wherein the event is the material loading event.

7. The method of claim 1, wherein determining the one-to-one association is performed based on the destination address and an instruction of the set.

8. The method of claim 1, wherein the real-time deterministic communications network is a fieldbus network.

9. The method of claim 1, further comprising, before determining the simulated state:
 classifying the virtual component as an unknown component type;
 determining an observed output of the physical machine; and
 after classifying the virtual component as the unknown component type, classifying the virtual component as a first component type based on the observed output and an instruction of the set;
 wherein the physical component is a component of the first component type.

10. The method of claim 1, further comprising:
 determining a second one-to-one association between a second physical component and a second virtual component, wherein the physical machine comprises the second physical component;
 at the data analyzer, receiving a second set of instructions transmitted on the real-time deterministic communications network from the controller to the second physical component;
 for each instruction of the second set:
  at the data analyzer, determining that the instruction is associated with the second physical component; and
  in response to determining that the instruction is associated with the second physical component, associating the instruction with the second virtual component based on the second one-to-one association;
 in response to associating each instruction of the second set with the second virtual component, determining a simulated state of the second virtual component, comprising simulating operation of the second virtual component based on the second set of instructions; and
 based on the simulated state of the second virtual component, determining that a second event associated with physical machine operation has occurred.

11. The method of claim 1, further comprising:
 at the data analyzer, after receiving the set of instructions, receiving a second set of instructions transmitted on the real-time deterministic communications network from the controller to the physical component;
 determining an updated simulated state of the virtual component, comprising simulating operation of the virtual component based on the simulated state and the second set of instructions;
 based on the updated simulated state of the virtual component, determining that a second event associated with physical machine operation has occurred.

12. The method of claim 11, wherein:
 the event is associated with product completion;
 the second event is associated with product completion; and
 based on determining that the event and second event have occurred, determining a rate of product completion associated with the physical machine.

13. The method of claim 1, wherein each instruction of the set propagates on the real-time deterministic communications network to the physical component substantially without delay.

14. A method for physical machine monitoring, comprising:
 determining a first one-to-one association between a first physical component and a first virtual component, wherein:
  a physical machine comprises the first physical component; and
  the first physical component is associated with a first destination address;
 determining a second one-to-one association between a second physical component and a second virtual component, wherein:
  the physical machine comprises the second physical component; and
  the second physical component is associated with a second destination address;
 at a data analyzer, receiving a set of instructions transmitted from a controller,
 wherein the physical machine comprises the controller and does not comprise the data analyzer, wherein the set of instructions comprises:
  a first subset transmitted from the controller to the first physical component, wherein receiving the first subset comprises, for each instruction of the first subset, receiving a respective frame, wherein the respective frame comprises the instruction and the first destination address; and
  a second subset transmitted from the controller to the second physical component,
 wherein receiving the second subset comprises, for each instruction of the second subset, receiving a respective frame,
 wherein the respective frame comprises the instruction and the second destination address;
 at the data analyzer, for each instruction of the first subset, based on the first destination address, determining that the instruction is associated with the first physical component;
 at the data analyzer, for each instruction of the second subset, based on the second destination address, determining that the instruction is associated with the second physical component;
 determining a simulated state of the physical machine, comprising:
  for each instruction of the first subset, in response to determining that the instruction is associated with the first physical component, simulating operation of the first virtual component based on the instruction and the first one-to-one association, comprising simulating execution of the instruction; and for each instruction of the second subset, in response to determining that the instruction is associated with the second physical component, simulating operation of the second virtual component based on the instruction and the second one-to-one association; and based on the simulated state of the physical machine, determining that an event associated with physical machine operation has occurred.

15. The method of claim 14, wherein:
a first instruction of the first subset is an instruction for first physical component motion; and
simulating operation of the first virtual component based on the first instruction comprises altering a simulated position of the first virtual component, wherein, after altering the simulated position, the simulated position is substantially identical to a position of the first physical component.

16. The method of claim 15, wherein determining that an event associated with physical machine operation has occurred comprises:
after altering the simulated position, determining that the simulated position is within a geofence associated with product rejection; and
based on determining that the simulated position is within the geofence, determining that a product rejection event has occurred, wherein the event is the product rejection event.

17. The method of claim 14, wherein:
the physical machine further comprises a third physical component;

the set of instructions further comprises a third subset transmitted from the controller to the third physical component; and the method further comprises, for each instruction of the third subset:
determining that the instruction is not associated with the first physical component and is not associated with the second physical component; and
in response to determining that the instruction is not associated with the first physical component and is not associated with the second physical component, ignoring the instruction, wherein determining the simulated state of the physical machine is not based on the instruction.

18. The method of claim 14, wherein:
for each instruction of the first subset, determining that the instruction is associated with the first physical component is performed based on an instruction type of the instruction; and
for each instruction of the second subset, determining that the instruction is associated with the second physical component is performed based on an instruction type of the instruction.

19. The method of claim 14, wherein the first and second subset each comprise a first instruction transmitted to both the first and second physical components.

20. The method of claim 14, further comprising, at the data analyzer, receiving a set of measurements transmitted from a sensor of the physical machine to the controller, wherein determining the simulated state of the physical machine is performed based further on the set of measurements.

* * * * *